Feb. 2, 1960   F. H. SHEPARD, JR   2,923,933
RADIO RANGE FINDER
Filed March 6, 1953   2 Sheets-Sheet 2

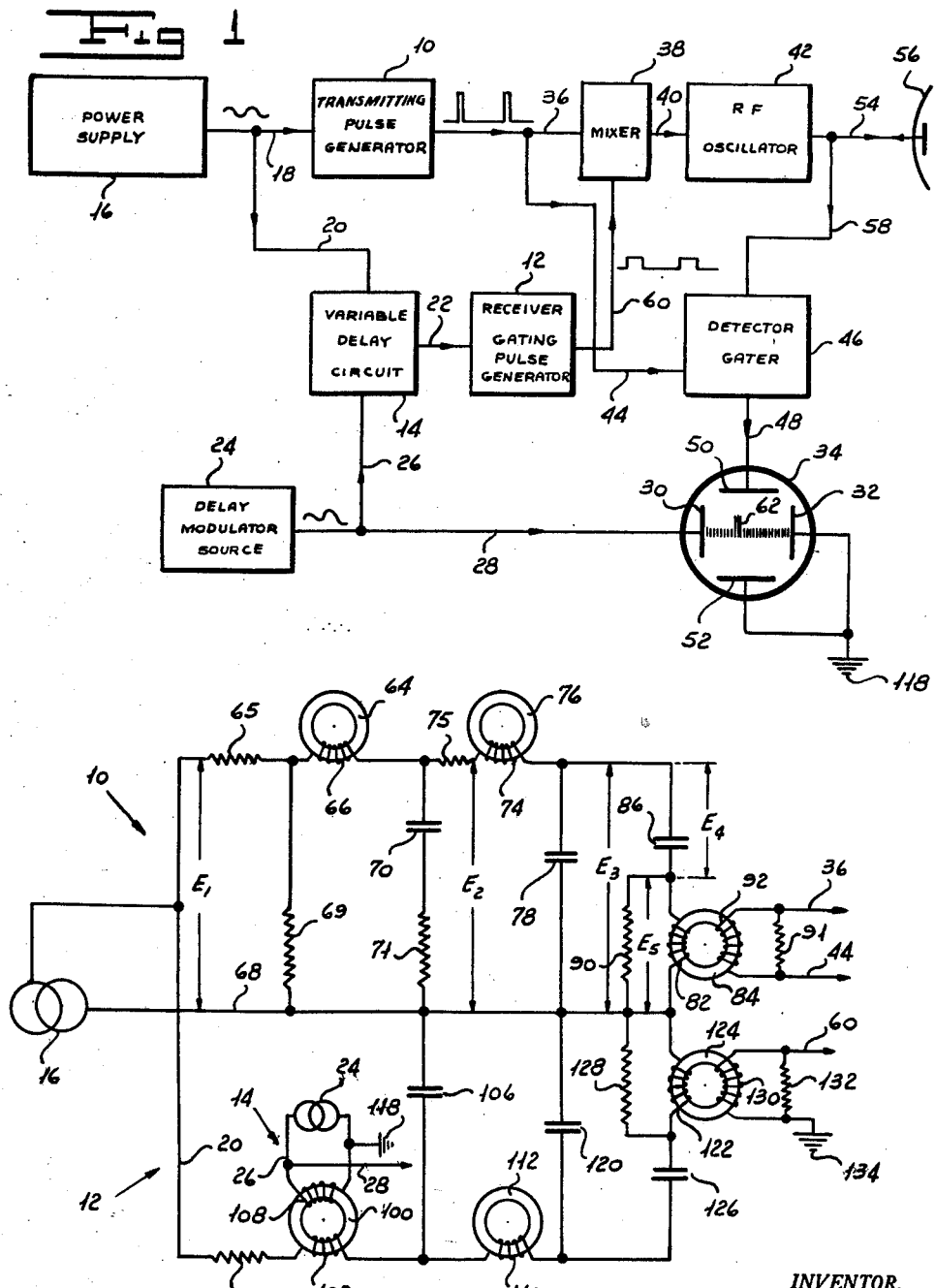

INVENTOR.
FRANCIS H. SHEPARD JR.
BY Henry L. Shenier
ATTORNEY

2,923,933

RADIO RANGE FINDER

Francis H. Shepard, Jr., Madison, N.J.

Application March 6, 1953, Serial No. 340,744

6 Claims. (Cl. 343—13)

My invention relates to a radio range finder and more particularly to an improved radio range finder of simple and inexpensive construction.

In my copending application, Serial No. 340,745 filed March 6, 1953, I have shown a super-regenerative radio range finder in which an oscillator was enabled at varying times to act at once as a transmitter of radio energy and a superregenerative receiver. The arrangement in my copending application is such that the oscillator was operated in the logarithmic mode. When the interpulse time in the operation of the range finder of my copending application was such that an echo was received at the instant the oscillator was enabled, the amplitude of the oscillations would build up much sooner due to the reception of the reflected energy. This would be evidenced as a pip on an oscilloscope and the interpulse time creating this condition was employed to measure distance.

In the instant application I have an improved construction in which I operate the oscillator in the linear mode. Operation in the linear mode gives me increased sensitivity and the output of the superregenerative receiver will be directly proportional to the input.

In the instant invention I first repeatedly drive a radio-frequency oscillator as at ransmitter with low negative resistance at a fixed repetition rate and quench the oscillator after it reaches saturation, thus generating square pulses of radio-frequency energy. Thereafter I again repeatedly enable the oscillator with a higher value of negative resistance at varying times after each transmission, and quench the oscillator before it reaches equilibrium in order to operate the oscillator as a superregenerative receiver in the linear mode. When the time of enabling the oscillator corresponds with the arrival of the reflection of the transmitted energy, the superregenerative receiver will build up to a higher level and produce an increased amplitude of oscillations, indicating the presence of a target from which the echo was reflected. The enabling of the oscillator after the main transmission signal, the reflection of which is to be received, may be accomplished by much lower power.

One object of my invention is to provide a radio range finder which will greatly simplify the means for transmitting and receiving pulses.

Another object of my invention is to provide a radio range finder having an oscillator operated as a transmitter and as a superregenerative receiver operating in the linear mode.

Another object of my invention is to provide a radio range finder having high energy in the transmitting pulse while remaining in the linear mode when used as a receiver.

Another object of my invention is to provide a radio range finder having a superregenerative receiver of increased sensitivity.

A further object of my invention is to provide a radio range finder employing a superregenerative receiver in which the noise factor is quite low and comparable with the noise factors of other types of radio receivers.

Other and further objects of my invention will appear from the following description.

In general, my invention contemplates the provision of an oscillator adapted to transmit high-frequency radio pulses which are to be reflected from an object whose range is to be measured. I pulse the oscillator at a repetitive rate which may be fixed or may be random. At varying times after each transmission I again enable the oscillator, which now acts as a superregenerative receiver, quenching the oscillator in this enabling, before it reaches saturation. The time elapsing between the first pulse and the enabling becomes a measure of range if the enabling coincides with the reception of an echo. The variation in the enabling time is employed to control the position of a spot on an oscilloscope and the amplitude of oscillations received is measured at this spot on the oscilloscope. An increase in the amplitude of oscillations will, in the superregenerative receiver, indicate the coincidence of a return with the enabling of the receiver and hence represent a target.

In the accompanying drawings which form part of the instant specification and which are to be read in conjunction therewith and in which like reference numerals are used to indicate like parts in the various views:

Figure 1 is a schematic view showing a radio range finder containing one embodiment of my invention.

Figure 2 is a diagrammatic view of a portion of the circuit of the radio range finder shown in Figure 1.

Figure 3:
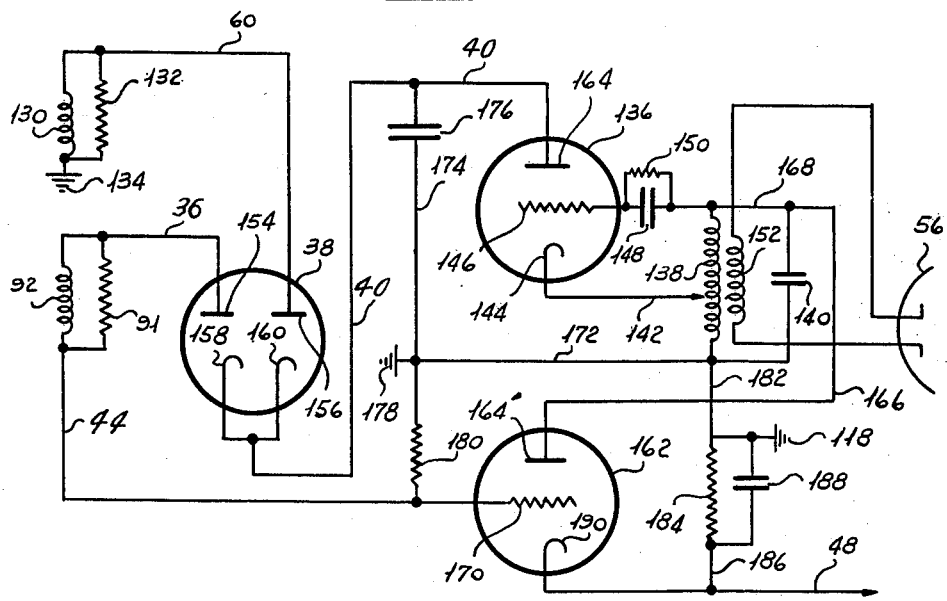
Figure 3 is a diagrammatic view of another portion of the circuit shown in Figure 1.

A superregenerative system is one in which a circuit is alternately made oscillatory and nonoscillatory at a predetermined radio-frequency rate. A single tube superregenerative receiver is capable of such tremendous amplification that full output may be obtained merely from the thermal-agitation noise level. There are three modes of operation in superregeneration, namely, the separate quenching of the oscillator in the logarithmic mode, the separate quenching of the oscillator in the linear mode, and by using a self-quenching oscillator. In the logarithmic mode, the operating conditions are so chosen that the oscillations are able to build up to an equilibrium value before being quenched. In absence of a signal, thermal-agitation noises in the input circuit produce an initiating voltage which starts the build-up process. When, however, an incoming signal is present, represented in the instant case by a reflection from the target, the signal provides the initiating pulse for the build-up period and causes build-up to be more rapid so that equilibrium is reached sooner than when the incoming signal is not present. This causes the area under the envelope of oscillations to increase in proportion to the logarithm of the elapsed time after the oscillator is enabled.

In the linear mode of operation the oscillator is quenched before saturation. The quenching time is so chosen in its relationship to the circuit constants that oscillations will not build up to equilibrium value before being quenched. In this mode of operation the incoming signal causes the starting amplitude of the build-up period to be increased by an amount dependent upon the amplitude of the incoming signal. The greater starting amplitude enables the maximum amplitude to be reached before quenching to be greater.

Operation in the linear mode results in an output directly proportional to the input. A receiver operated in the linear mode has more sensitivity. The build-up of the amplitude of oscillations reached is a linear function of the initial amplitude which is represented by noise level. In this manner a simple oscillator which is enabled periodically, acts as a high-gain radio-frequency amplifier. The band width of a superregenerative receiver is directly proportional to the rate of rise of oscillation amplitude. If we employ a large feedback in the oscillator circuit and use short enabling pulses, the superregenerative receiver will have a wide band width. If we employ lesser amounts of feedback and use longer enabling pulses, we can make the band width narrower. Superregenerative receivers employed for communication purposes have an inherent noise level which is many times the noise level of receivers of other types such as superheterodyne receivers or tuned radio-frequency receivers. This is in part owing to the fact that the quench frequency must be high as compared with the intelligence frequency. This necessitates the use of a rapid build-up by high feedback and a wide selectivity band width. In a conventional superregenerative receiver the selectivity band width may be twenty-five times that of the intelligence band width. Since the noise factor is proportional to the square root of the selectivity band width, the noise level in a superregenerative receiver for communication purposes will automatically be approximately five times as great as that of conventional receivers. In the instant invention, however, the selectivity band width and the intelligence band width may be the same. I propose to enable the oscillator once after each transmitted pulse, and the enabling pulse can be comparatively short in duration. It will be seen, therefore, that since the selectivity band width and the intelligence band width may, in the instant invention, be the same, my superregenerative receiver will be so operated that its noise factor is comparable to the noise factors of other types of radio receivers.

Referring now to Figure 1, I provide a transmitting pulse generator 10 and a receiver gating pulse generator 12. These pulse generators are shown in detail in Figure 2 and are also described in my copending application for Square Pulse Generator, Serial No. 340,746 filed March 6, 1953. The pulse generators shown are reliable in operation and simple to construct and employ no thermionic tubes. The time after the transmitting pulse that the receiver gating pulse generator 12 is actuated is controlled by a variable delay circuit 14. A power supply 16 may take the form of an oscillator or any other appropriate source of alternating or pulsating current. I may advantageously for some applications employ a thyratron which is fired repeatedly to furnish the power supply. The power supply is impressed through channels 18 and 20 to the transmitting pulse generator and through the variable delay circuit to the receiving pulse generator. Since both the pulse generators receive their energy from a common power supply they are in my invention automatically synchronized. The output of the variable delay control circuit is impressed through channel 22 upon the receiver gating pulse generator 12 and controls its delay. It will be remembered that in the instant invention the transmitting pulse generator is operated at a fixed or random repetitive rate. The oscillator is enabled at varying times after the transmitting pulses are sent out. When the enabling time coincides with a return from a target, the buildup of the amplitude of oscillations of the superregenerative oscillator is from a greater amplitude and the resultant increase of output energy is indicated to show a return. Accordingly, the receiver gating pulse generator 12 is enabled as the oscillator at varying times. The variable delay circuit 14, therefore, is controlled by a delay modulator source 24, the output of which passes through channel 26 to the variable delay circuit. The delay modulator output also passes through channel 28 and is impressed across elements 30 and 32 of a cathode-ray oscilloscope 34. The voltage across elements 30 and 32 determines the spot position laterally of the face of the oscilloscope which may be an "A" presentation. Since the same modulating source controls the delay and the spot position, the spot position will always represent the range to a particular definite spot. The output of the transmitting pulse generator passes through channel 36 to a mixer 38, from which the pulse passes through channel 40 to the radio frequency oscillator 42. The output of the transmitting pulse generator also passes through channel 44 to a detector gater 46. The arrangement is such that the detector gater is blocked by the transmitting pulse so that this pulse will not pass through channel 48 for presentation across elements 50 and 52 of the cathode-ray oscilloscope 34. The output of the radio frequency oscillator 42 passes through channel 54 for transmission through a microwave antenna 56 along the range being explored. A return or echo of the radio energy is also adapted to be received by the antenna 56 and passes through channel 54 to the RF oscillator 42. Whenever the oscillator is enabled, the output of the oscillator passes through channel 58 to the detector gater 46. If the detector gater 46 is not blocked, the output of the RF oscillator will be impressed into channel 48 upon element 50 between it and element 52 to indicate the amplitude of the oscillations in the RF oscillator 42. The oscillator 42 is first enabled during the transmitting phase by the transmitting pulse generator. It is enabled during the receiving phase by the pulse generated in the receiver gating pulse generator. These pulses pass through channel 60 to the mixer 38 and thence through channel 40 to the oscillator 42.

It will be readily apparent that the gating pulse generator enables the oscillator at varying times after each transmitted pulse. When the enabling time coincides with the time reflected energy is received, there will be a build-up in the amplitude of the oscillations of the oscillator 42 at a spot, say 62, upon the face of the oscilloscope 34. When there is no echo, the energy of the radio-frequency oscillator 42 will appear as "grass" on the oscilloscope. The position of the spot is controlled by the same modulation source as controls the enabling time, so the spot position and the time after each transmitting pulse at which the oscillator is enabled for reception is automatically synchronized.

Referring now to Figure 2, the power supply 16 is shown as an oscillator or an alternator. The transmitting pulse generator is indicated generally by the upper portion of the circuit shown in Figure 2 by the reference numeral 10. It comprises a first saturable core 64 having a winding 66. For ease in understanding the manner in which the pulses are generated, let us consider, for purposes of explanation, that the choke coil 66 with its saturable core 64 presents an infinite impedance to the passage of electrical current before saturation is reached and then presents a negligible impedance after saturation is reached. The flux in the core is a function of the product of current, the number of turns in the choke coil and the reciprocal of the reluctance of the core. The voltage generated across the coil is proportional to the rate of change of flux.

Figure 4:
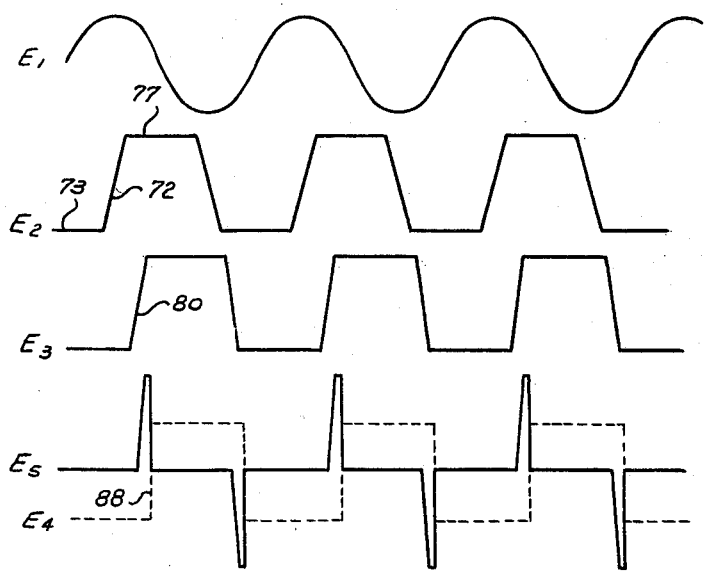
Figure 4 is a family of curves showing voltage time relationships existing in portions of the circuit shown in Figure 2, illustrating the manner of generating pulses.

Referring now to Figure 4, the curve $E_1$ represents the voltage impressed across the coil 66 from the power source 16 through conductor 68 and capacitor 70. The voltage curve $E_2$ represents the voltage time relationships existing across the capacitor 70 with the impressed voltage shown in curve $E_1$. It will be observed that when the core becomes alternately saturated in each direction, there is a change in voltage, owing to the fact that after saturation the coil permits current to pass. During the time the core is unsaturated, as indicated by the portions of the curve 73 and 77, there will be no voltage change across the capacitor 70 owing to the fact that during unsaturation the coil presents an infinite impedance. The voltage across the capacitor 70 is impressed across the winding 74 of a second choke coil having a saturable core 76 by means of capacitor 78. The voltage across the capacitor 78 is indicated as $E_3$. A curve showing the voltage time relationships of the voltage $E_3$ is shown in Figure 4 and it will be observed that the slope 80 of the change of voltage is steeper, that is, the rate of change of voltage is much higher in $E_3$ than in $E_2$, the changes occurring at the time the core 76 becomes saturated. The output of the coil 74, that is, the voltage across the capacitor 78, is impressed through a third coil 82 having a saturable core 84 through a capacitor 86. The voltage time relationships of the voltage across capacitor 86, that is, the voltage $E_4$, is shown in Figure 4 in dotted lines. It will be noted that the slope 88 indicating the rise time of the voltage in curve 84 is much steeper than the corresponding slope 80 of curve $E_3$. In actual practice, the rise time can be made a fraction of a microsecond. The voltage across the coil 82, $E_5$, is represented by the voltage across resistor 90. This voltage is the difference voltage between the voltage across capacitor 78 and the voltage across capacitor 86 owing to the fact that the capacitor 78 and the series circuit including resistor 90 and the capacitor 86 are connected in parallel, except for winding 82. Stated differently, the voltage $E_5$ is the difference between voltage $E_3$ and $E_4$. A curve showing the voltage time relationships of this difference voltage $E_5$ appears in Figure 4. It will be seen that the curve takes the form of a series of sharp pulses, the slope of one side of which is the rise time of the voltage $E_3$ in one direction and the slope of the other side of each pulse being the delay time of the voltage $E_4$ in the opposite direction. The core 84 carries a second winding 92 acting as a secondary of which winding 82 is the primary. The output energy of the pulse generator, therefore, appears across channels 36 and 44, which lead to the detector gater and the mixer, the operation of which will be described more fully hereinafter with reference to Figure 3. The resistors 69, 71 and 91 are damping resistors. The resistors 65 and 75 are current-limiting resistors, it being borne in mind that much higher energy is desired in the transmitting pulse generator than in the receiver gating pulse generator, to which reference will now be had. This gating pulse generator is indicated generally by the reference numeral 12 and is shown in the lower portion of Figure 2. It comprises a first saturable core 100 on which a winding 102 is positioned. The voltage from the power supply 16 is impressed by channel 20 through a current-limiting resistor 104 across coil 102, the voltage across which will be generally similar to the voltage across capacitor 70. It will be observed, however, that a second winding 108 is wound around core 100. This winding comprises a portion of the variable delay circuit indicated generally by the reference numeral 14. The coil 108 is connected across an alternator 24 which comprises the delay modulating source. The output of the alternator 24 will premagnetize the core 100 in one direction or the other, depending upon the instantaneous polarity of the oscillator voltage. The premagnetization in one direction or the other will shorten or delay the build-up time to saturation in that direction depending upon the direction and its phase relation with the voltage being applied from the power supply alternator 16. This will change the timing of the gating pulses with respect to the occurrence of the transmitting pulses. One terminal of the alternator, which is the delay modulator source, is connected to ground 118. The other terminal of the alternator 24 is connected by channel 28 to the element 30 of the oscilloscope, as shown in Figure 1. It will be seen, therefore, that the spot position laterally of the oscilloscope to indicate range is automatically synchronized with the delay time for enabling the oscillator to receive echoes. The voltage across capacitor 106 is impressed across a second winding 110 disposed about a core 112 by means of capacitor 120 analogous to capacitor 78 of the transmitting pulse generator. The voltage of capacitor 120 is impressed across the winding 122 disposed upon core 124 by means of capacitor 126. The difference voltage across the capacitors 120 and 126 appears across resistor 128 and will take the form of a series of pulses similar to those shown in Figure 4 by curve $E_5$. The pulses, however, will occur at varying times due to the variable delay circuit and will be of longer duration owing to the differences in the constants chosen for the cores and the windings.

It will be seen that the gating pulse generator produces pulses of the same character as the transmitting pulse generator, except that they are of much lower power and of longer duration.

The core 124 on which the winding 122 is disposed carries a second winding 130 which acts as secondary of the transformer of which winding 122 is the primary. A resistor 132 damps transients across the winding 130. One end of the winding 130 is connected to ground 134 and the other end of the winding is connected by channel 160 to the mixer 38, as can be seen in Figure 3, to which reference is now had.

The oscillator 42 of Figure 1 comprises a thermionic tube 136 connected in an oscillating circuit, the tank circuit of which comprises an inductance 138 and a capacitor 140. An intermediate point of the inductance 138 is connected by conductor 142 to the cathode 144 of tube 136. The grid 146 of the tube 136 is connected by a grid capacitor 148 and a grid leak resistor 150 to the tank circuit. It will be understood that any suitable oscillating circuit may be employed. The inductance 138 is inductively coupled to a winding 152 which is connected to the antenna 56. It is understood that any appropriate thermionic tube may be employed. In practice, high frequencies can more readily be obtained by the use of a lighthouse tube or a klystron. The mixer tube 38 comprises a pair of anodes 154 and 156 and a pair of cathodes 158 and 160 which are interconnected and connected by conductor 40 to the plate 164 of the oscillator tube 136. The detector gater comprises a tube 162, the plate 164 of which is connected by conductor 166 to the grid conductor 168 of the tube 136. The grid 170 of the tube 162 is connected by conductor 44 to one side of the secondary winding 92 of the transmitting pulse transformer. The other side of the secondary winding 92 of the transmitting pulse transformer is connected by conductor 36 to the anode 154 of the mixer tube 38. One side of the secondary winding 130 of the gating pulse transformer is connected to ground 134. The other side of this secondary winding 130 is connected by conductor 60 to the second anode 156 of the mixer 38. It will be remembered that one side of the tank circuit of the oscillator is connected to the grid 146. The other side of the tank circuit is connected to the plate 164 of the oscillator 136 through conductor 172, conductor 174, capacitor 176 and conductor 162. The grid 170 is connected to ground 178 through resistor 180. The conductor 48 is connected to the element 50 of the oscilloscope, as shown in Figure 1. The lower end of winding 138 is connected by conductor 182 to a resistor 184, the other end of which is connected by conductor 186 to the conductor 48. The capacitor 188 is adapted to filter radio frequency to ground 118.

In operation, the transmitting pulse generator will generate voltage pulses at a fixed repetition rate determined by the oscillator or alternator supply. These pulses will be impressed upon the anode 154 of the mixer 38. Whenever these pulses are strongly positive, electrons will flow from the capacitor 176 through the conductor 162 to the cathode 158 to the anode 154, thus driving the upper terminal of the capacitor 176 strongly positive. This applies a strong positive voltage to the plate 164 of the oscillator tube 136 and sets it into operation. Since the pulse is of short duration, the duration of energy applied to anode 164 is likewise short. Capacitor 176 is an effective R.F. by-pass but does not appreciably by-pass the enabling pulses. When the enabling pulse ceases, the oscillator will automatically become quenched, limiting the duration of the transmitted pulse. During the transmitting cycle I drive the oscillator to equilibrium by the supplying of positive potential to the plate 164 through a short, though sufficiently long, predetermined period of time. It will be appreciated that the energy to be supplied for transmission may be of any appropriate amount by making the applied voltage quite high. The oscillations in the tank circuit of the oscillator are reproduced inductively in the secondary winding 152 and transmitted by the antenna along the direction being investigated. It will be observed that when the conductor 166 becomes repetitively positive during the oscillations which occur in the tank circuit of the oscillator, the plate 164' will become positive and that electrons will tend to flow from the conductor 48 to the cathode 190 of the detector gater 162. At this instant the ground 118 is strongly negative owing to the fact that conductor 182 is connected to the point of opposite polarity of the winding 138. It would appear, therefore, that unless prevented, a large pip would be generated upon the oscilloscope 34 during each transmission of energy. It will be noted, however, that the other end of winding 92 is connected by conductor 44 to the grid 170 of the detector gater tube 162. Whenever the anode 164' is driven strongly positive by a transmitting pulse, the grid 170 is driven strongly negative. This blocks the flow of electrons from plate 164' to the cathode 190 and prevents a deflection of the cathode ray of the oscilloscope in a vertical direction at this instant.

The high packet of high-frequency energy which has been emitted by the oscillator and beamed by the antenna travels along the direction in which the antenna is oriented until it strikes a target. The energy is then reflected from the target and the echo is received by the antenna and appears in the winding 152, which is inductively coupled to the winding 138. Let us assume that when this energy is received, the oscillator 136 is not enabled. This energy will have no effect upon the oscilloscope. If, however, at the very instant the energy is received, a gating pulse is generated, this pulse will be applied to the anode 156 of the mixer 38. The other terminal of the gating pulse secondary winding 130 is grounded at 134 so that it will not drive the grid 170 of the detector gater 162 negative. The pulse, however, will drive the plate 164 positive in a manner similar to the driving of the plate positive described above in connection with the transmitting pulse. Whenever the plate 164 is positive, the oscillator is enabled. The coincidence of the enabling of the oscillator with the reflection of an echo will cause a rapid build-up of oscillations in the oscillator which now acts as a superregenerative receiver. The positive voltage of the alternating current across the tank circuit 138—140 will cause electrons to flow from conductor 48 to the cathode 190 to the plate 164' of the detector gater tube 162. This will cause an indication, or pip, upon the oscilloscope 34, the amplitude of which is directly proportional to the signal received. This follows from the fact that the energy of the gating pulse is such that the oscillator will be operated in the linear mode. There is not sufficient plate voltage and hence not low enough negative resistance to permit the oscillator to go to saturation within the pulse time. The receiver gating pulses will be much lower in amplitude and may be of longer duration than the transmitting pulses.

We have seen that the gating pulses are timed at varying periods following each transmitting pulse by the variable delay circuit and the delay modulating source. In this manner the entire range is investigated for targets. Whenever the enabling coincides with a return, the target will be indicated.

In a radar system the distance is ascertained by the following formula when the pulse times can be considered negligible:

$$d = c \times \frac{T}{2}$$

where $c$ is the velocity of radiation propagation and $T$ is the time elapsing from the beginning of the transmitted pulse to the beginning of the received echo. If the gating time is varied until it is equal to T, then the time of arrival of the reflected pulse will coincide with the time the oscillator is enabled. The oscilloscope can be readily calibrated so that it will indicate a function of range. Since the range to be examined is comparatively minute and the velocity at which radio-frequency waves travel is high, a large number of bearings may be examined within a very short period of time.

For purposes of convenience, I have shown a cathode-ray tube for displaying the signals. It is to be understood, of course, that any appropriate indicating means may be employed. For example, the cathode-ray tube 34 may be a simple galvanometer and the delay modulator source may be a manually controlled potentiometer calibrated in range. The potential can be varied manually and the galvanometer watched. When the galvanometer needle indicates a return, the range can be read at this point.

While I have shown a single tube which acts as both a transmitter and a superregenerative receiver, it will be readily understood by those skilled in the art that I can employ a separate oscillator as a superregenerative receiver, if desired. For example, I may advantageously employ a magnetron as the transmitting oscillator and a klystron as a receiving oscillator.

It will be seen that I have accomplished the objects of my invention. I have provided a radio range finder which greatly simplifies the transmission and reception of pulses. My radio range finder has an oscillator operated both as a transmitter and a superregenerative receiver operating in the linear mode. I have provided a radio range finder having a high energy in the transmitting pulses while the oscillator remains in the linear mode when acting as a receiver, thus enabling the oscillator to act as a superregenerative receiver of increased sensitivity and having a low noise factor.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A radio range finder including in combination a normally inoperative radio frequency oscillator, a first source of alternating current of a fixed frequency appreciably less than the radio frequency of said oscillator, a first pulse generator, a second pulse generator, means for coupling the first source to the first pulse generator to cause the first pulse generator to produce a train of pulses, means responsive to the pulses from the first pulse generator for enabling the oscillator as a transmitter at a fixed repetition rate equal to the frequency of the first source, a second source of alternating current having a frequency which is appreciably less than the frequency of said first source, means coupling the first source and the second source to the second of said two pulse generators to cause the second pulse generator to produce a train of pulses which occur at varying times with respect to the pulses produced by the first generator and means responsive to the pulses from the second pulse generator for enabling the oscillator as a superregenerative receiver.

2. A radio range finder as in claim 1 in which each pulse generator comprises a saturable reactor.

3. A radio range finder as in claim 1 in which each pulse generator comprises a capacitor and a saturable reactor.

4. A radio range finder as in claim 1 in which each pulse generator comprises a saturable reactor and in which the means for enabling the oscillator as a transmitter comprises a first unilateral impedance and in which the means for enabling the oscillator as a superregenerative receiver comprises a second unilateral impedance.

5. A radio range finder as in claim 1 in which the first pulse generator comprises a first saturable reactor and in which the second pulse generator comprises a second saturable reactor and in which each of said coupling means is an inductive coupling means.

6. A radio range finder as in claim 1 in which said second pulse generator includes means for limiting the energy content of the pulses generated thereby to cause said oscillator to operate in the linear mode.

References Cited in the file of this patent

UNITED STATES PATENTS

| | | |
|---|---|---|
| 2,246,177 | Levoy | June 17, 1941 |
| 2,406,871 | Varela | Sept. 3, 1946 |
| 2,416,718 | Shockley | Mar. 4, 1947 |
| 2,419,570 | Labin | Apr. 29, 1947 |
| 2,498,495 | Jensen | Feb. 21, 1950 |
| 2,532,221 | Bradley | Nov. 28, 1950 |

OTHER REFERENCES

Superregenerator Design, Hazeltine, Electronics, September 1948, pp. 99–102.

An Examination of Performance Capabilities, Eltgroth, Tele-Tech, February 1949, pp. 24–27 and March 1947, pp. 40–43 and 71.